July 11, 1972   M. QUATINETZ ET AL   3,676,084
REFRACTORY METAL BASE ALLOY COMPOSITES
Original Filed March 25, 1966

INVENTORS
MAX QUATINETZ
JOHN W. WEETON
THOMAS P. HERBELL

BY

ATTORNEYS

United States Patent Office 3,676,084
Patented July 11, 1972

3,676,084
REFRACTORY METAL BASE ALLOY COMPOSITES
Max Quatinetz, Bay Village, John W. Weeton, Rocky River, and Thomas P. Herbell, Parma, Ohio, assignors to the United States of America as represented by the Administrator of the National Aeronautics and Space Administration
Original application Mar. 25, 1966, Ser. No. 539,255, now Patent No. 3,472,709, dated Oct. 14, 1969. Divided and this application Jan. 24, 1969, Ser. No. 793,657
Int. Cl. C22c 31/04
U.S. Cl. 29—182.5         2 Claims

ABSTRACT OF THE DISCLOSURE

High temperature composites of a dispersion strengthened tungsten wherein a portion of the refractory compounds are reprecipitated for uniform distribution and a finer particles size.

ORIGIN OF THE INVENTION

The invention described herein was made by employees of the United States Government and may be manufactured and used by or for the Government for governmental purposes without the payment of any royalties thereon or therefor.

RELATED APPLICATION

This application is a division of copending application Ser. No. 539,255, filed Mar. 25, 1966, entitled "Method of Producing Refractory Composites Containing Tantalum Carbide, Hafnium Carbide, and Hafnium Boride" and now Pat. No. 3,472,709.

BACKGROUND OF THE INVENTION

This invention is concerned with high strength refractory metals that are stable at high temperatures. More particularly, the invention relates to the improved distribution of refractory compounds and micro-constituents in a refractory metal matrix.

Refractory compounds and micro-constituents are incorporated into a refractory metal matrix conventionally by melting refractory metals and simultaneously adding reactive metals and interstitial compounds to the molten matrix material. Upon consolidation of cast billets or ingots and subsequent working a rejection of particles of refractory compounds that strengthen the matrix occurs. The methods employed for making refractory materials are quite similar to those used for superalloys and nonferrous metals which involve casting, mechanical working, and heat treatment. Other methods utilize pre-alloyed powders which react to produce precipitates, intermetallic compounds, or carbides, and in some cases, refractory compounds are produced.

To illustrate the conventional procedure of the prior art, a metal solvent (X) is melted with soluble metals (A) and (B), or (X) may be melted alone with (A) and (B) being added subsequent to melting. The resulting melt is a liquid solution of the solvent (X) with (A) and (B) in solution. A precipitate of an (AB) compound may form on cooling this type of material. However, very frequently (A) and (B) segregate in either the grain boundaries or the dendritic interstices. Sometimes (A) and/or (B) combine with (X) to form other components or phases that segregate. This type of segregation is termed ingotism.

Any of the prior art methods which involves the conventional melting and casting of refractory metals to produce precipitates or other configurations of refractory compounds embedded in a metallic matrix has an inherent disadvantage noted in all cast and wrought products. This is the segregation of alloying constituents and micro-constituents as a result of the casting. Segregation of these constituents, as well as of alloying elements which takes place during the casting, is a result of the previously described phenomenon termed ingotism.

Another disadvantage is that greater impurity contents occur in the dendritic interstices and the grain boundaries. Subsequently, upon mechanical working and processing, micro-constituents and alloying elements that segregate during casting are stringered, elongated, sometimes fragmented, but are rarely homogeneously distributed.

In an effort to solve these problems, powder metallurgy techniques have been proposed to obtain greater uniformity of microstructures. While the problem of ingotism is avoided by these powder metallurgy techniques and the process of precipitation is most often uniform and well carried out, the usual procedure in reacting these types of powders does not permit the incorporation of large quantities of products into the matrix. Inherent in both the pre-alloyed method and in the casting concept is the fact that the quantities of refractory compounds are produced by reactions or by dissolution and precipitation are limited.

SUMMARY OF THE INVENTION

According to the present invention these types of compounds can be incorporated in the material in any given or desired amount up to the saturation point. By way of illustration, powders of an (AB) compound formed from (A) and (B) are distributed throughout a powdered matrix (X). The mixture is compacted and densified to form a fine uniform distribution of (AB) in (X). The composite is heated to a high temperature either before, during, or subsequent to fabrication so that a part or all of the (AB) dissolves into (X) and forms a partial or total solid solution in (X). That portion of the compound (AB) that dissolves into solution is subsequently precipitated uniformly throughout the microstructure by heat treating and aging processes.

Also, the material may be worked prior or subsequent to the dissolution of (AB). The working followed by aging uniformly or advantageously distributes a fine precipitate of (AB) throughout the structure. The residual undissolved particles of (AB) in themselves also add dispersion strength to the composite.

The invention utilizes a powder metallurgical process in which refractory compounds are mechanically mixed with refractory metal powders, with or without attrition or grinding. This is followed by a densification or consolidation procedure which includes cold compaction and sintering or hot pressing. Mechanical working at elevated temperatures that either dissolves portions of the refractory compounds added to the mix or that causes the refractory compounds to react with the refractory metal matrix powder can be utilized.

In general, consolidation and densification of the product pertains to billets that would subsequently be processed by other methods, such as extrusion. The mechanical processing further densifies the product while producing nucleation sites within the product thereby permitting subsequent precipitation of some of the dissolved constituents to occur in the nucleation sites so produced. The residual undissolved refractory compound particles also add dispersion or fiber strength to the composite.

OBJECTS OF THE INVENTION

It is, therefore, an object of the present invention to provide improved refractory metal base alloy composites in which the quantity of refractory compounds added to a metallic matrix is in excess of that possible by conventional casting or pre-alloyed powder methods.

Another object of the invention is to provide an improved alloy in which the spacing of compound particles is prearranged in a controlled fashion.

A further object of the invention is to provide an alloy having a better homogeneous distribution than that obtained with conventional pre-alloyed powder metallurgy approaches.

These and other objects and advantages of the invention will be apparent from the drawing and the specification which follows.

DESCRIPTION OF THE PREFERRED EMBODIMENT

Figure 1:
FIGS. 1 and 2 are electro-micrographs of a test specimen illustrating the reprecipitation of a refractory metal compound which was added in accordance with the present invention to a high temperature refractory matrix.

To illustrate the features of the invention, refractory composite specimens were prepared by adding powders having a wide range of melting temperatures and reactivities to tungsten. Composites comprising tungsten with 8 or 10 volume percent of oxide or refractory compounds were extruded into bar stock. All the billets were extruded at a temperature of 4200° F. and a reduction ratio of 8:1.

The refractory compounds added were hafnium boride, nitride and carbide as well as tantalum carbide. Photomicrographs of the composites showed the hafnium nitride was also fibered during the extrusion process. The other refractory compounds were deformed to a small extent and reacted with the tungsten.

The powders used in preparing the billets are shown in Table I. The compositions of the billets and their processing are listed in Table II.

TABLE I.—BILLET MATERIALS

| Material | Nominal purity, weight percent | Particle size, microns | Melting point, °F. | Density, g./cc. |
|---|---|---|---|---|
| Tungsten | 99.96 | 1.2 | 6,170 | 19.30 |
| Refractory compounds: | | | | |
| Hafnium boride | 93.3 | 6.8 | 5,880 | 11.20 |
| Hafnium nitride | 96.6 | 4.6 | 5,990 | 14.00 |
| Hafnium carbide | 95.4 | 4.2 | 7,039 | 12.70 |
| Tantalum carbide | 99.85 | 5.0 | 7,020 | 14.65 |

With regards to particle size nominally 1 micron tungsten powder was used. The refractory compounds were nominally 4 to 7 microns in diameter.

The powders used to prepare the composites were weighed and placed in a container partially filled with glass beads. Mixing occurred as the container was rotated at relatively slow speed, and the powders rolled gently without sliding or clinging to the sides of the container.

All the powders were compacted isostatically at 30,000 p.s.i. at room temperature. The powder was packed initially in a rubber mold set in a metal tube so that after processing and sintering the billet required a minimum of machining for canning and extruding.

The compacts were given a two hour presintering in hydrogen at 2600° F. This was followed by a two hour sintering in vacuum at 4200° F. to obtain improved density.

The composites shown in Table II were canned in containers of the softer materials, tantalum and molybdenum, to provide adequate lubrication at the high temperature of 4200° F. A variety of metals or other materials, such as oxides, glass, graphite and rubber were used as container lubricants. The extrusion die was also coated with oxides.

A nearly isostatic condition in which the extruding pressure was distributed uniformly about each billet was obtained by using the soft metal canning material. Less expensive molybdenum cans produced by powder metallurgy techniques were found to be a satisfactory substitute for the more expensive tantalum. The billets were protected from contaminations by the cans. In this manner, the extrusion capability for tungsten billets was extended to higher reduction ratios of 16:1 and higher temperatures of approximately 4200° F.

Stress-rupture tests of the extruded materials were conducted in a vacuum of $5 \times 10^{-5}$ torr at different stress levels at 3000° F. A number of tests were also conducted at 2500°, 3400°, 3500°, and 3800° F.

Photomicrographs of the stress-rupture specimens and of the extruded bars were prepared and examined. Fiber length-diameter ratios were determined and correlated with the stress-rupture life of the composites. Step-load creep tests were run with a few composites to evaluate rapidly their strength potential and to obtain suitable stresses for short-time stress-rupture tests.

Photomicrographs of transverse and longitudinal sections of the extruded material showed that the oxides were the most effectively fibered. From the microstructures it was noted that the extent of elongation varied with the degree of deformation throughout the extruded bar. The elongation was greater at the center than at the nose of the bar and greater at the edge than in the middle.

Examination of the tungsten-refractory-compound composites showed that the refractory compounds had reacted with the tungsten. Experimental evidence of reactions was obtained in the case of W-TaC and W-HfB$_2$ composites where the elongation of the additives was relatively small. In the case of the tantalum carbide composite, there was reaction in the nose of the bar and elongation toward the middle of the bar.

Figure 2:

The electron micrographs shown in FIGS. 1 and 2 were prepared at an original magnification of 31,800 from the nose portion of the extruded W-TaC composite. These figures show the extremely small tantalum carbide particles formed by the solutioning and reprecipitation of the 5 micron particles listed in Table I. FIGS. 1 and 2 show these tantalum carbide particles to be 0.05 micron. In addition, an X-ray analysis of the tungsten-hafnium boride composite showed the presence of a W$_2$B phase produced by the reaction of the HfB additive with the W matrix.

Stress-rupture tests were run at 3000° F. The stress for a 100 hour rupture life for each of the composites was obtained from these tests. These stresses are listed in the last column in Table II to provide a ready comparison of the strengths of the various composites.

While tungsten was used as the matrix metal in the composites tested, refractory compounds can be added to other refractory matrices such as Cb, Ta and Mo as well as to lower melting matrices, such as superalloys, in the

TABLE II.—TUNGSTEN BILLET COMPOSITIONS

| Composition | | Extrusion | | Test results | |
|---|---|---|---|---|---|
| Additive | Percent | Maximum extrusion pressure, lb./sq. in. | Ram speed, in./sec. | Type of strengthening | Stress/p.s.i., 100 hr. life |
|  | 0 | 115.7×10³ | 8.6 |  | 4,250 |
| Hafnium nitride | 8.0 | 172.6 | 6.6 | Fiber | 12,000 |
| Tantalum carbide | 8.0 | 173.6 | 9.0 | Reaction | 13,000 |
| Hafnium carbide | 8.0 | 197.6 | 4.0 | do | 17,000 |
| Hafnium boride | 8.0 | 131.7 | 9.8 | do | 17,500 | same manner. Other methods of incorporating the refractory compounds in a matrix or metal include chemical coprecipitation, electroplating, electrophoritics, ultrasonics and vaporization with condensation. Also, mechanical processes including rolling, swaging, forging, drawing and explosive deformation can be used instead of extrusion to work the composite. Explosive deformation techniques can also be utilized to consolidate the composites initially.

What is claimed is:

1. A high temperature metal base alloy composite with improved microstructure uniformity comprising
    a high temperature tungsten matrix,
    first particles of a refractory compound selected from the group comprising of hafnium carbide, hafnium boride, and tantalum carbide uniformly dispersed throughout said tungsten matrix for dispersion strengthening the same, said first particles comprising powders that are undissolved in said tungsten matrix and about 4–7 microns in diameter, and
    second particles of said refractory compound uniformly dispersed throughout said tungsten matrix, said second particles being smaller than about 0.05 micron in diameter and comprising precipitates of said refractory compound first dissolved in said tungsten matrix and reprecipitated therein in a finer form.

2. A high temperature composite as claimed in claim 1 wherein the refractory compound is about 8 volume percent of the composite.

References Cited

Jones, W. D.: Fundamental Principles of Powder Metallurgy, Edward Arnold (Publishers) Ltd., 1960, pp. 646–659.

Goetzel: Treatise on Powder Metallurgy, vol. I, Interscience Publishers, 1949, pp. 524–529.

Goetzel: Treatise on Powder Metallurgy, vol. II, Interscience Publishers, 1950, pp. 18–27.

Wulff: Powder Metallurgy, Amer. Society for Metals, 1942, pp. 430–3.

CARL D. QUARFORTH, Primary Examiner

B. H. HUNT, Assistant Examiner

U.S. Cl. X.R.

29—182.7, 182.8; 148—32